United States Patent
Ravnaas (10) Patent No.: US 11,441,589 B1
(45) Date of Patent: Sep. 13, 2022

(54) LOCKING DEVICE FOR A TELESCOPING LEG

(71) Applicant: Brent Ravnaas, Turtle Lake, ND (US)

(72) Inventor: Brent Ravnaas, Turtle Lake, ND (US)

(73) Assignee: Brent Ravnaas, Turtle Lake, ND (US)

( * ) Notice: Subject to any disclaimer, the term of this patent is extended or adjusted under 35 U.S.C. 154(b) by 0 days.

(21) Appl. No.: 17/363,320

(22) Filed: Jun. 30, 2021

(51) Int. Cl.
    *F16B 7/14* (2006.01)
    *F16M 11/26* (2006.01)

(52) U.S. Cl.
    CPC .......... *F16B 7/1454* (2013.01); *F16M 11/26* (2013.01)

(58) Field of Classification Search
    CPC ............................. F16B 7/1454; F16M 11/26
    See application file for complete search history.

(56) References Cited

U.S. PATENT DOCUMENTS

| | | | |
|---|---|---|---|
| 3,589,757 A | 6/1971 | Mooney | |
| 3,780,974 A | 12/1973 | Takahashi | |
| 3,941,492 A | 3/1976 | Meinunger | |
| 4,029,279 A | 6/1977 | Nakatani | |
| 4,596,484 A | 6/1986 | Nakatani | |
| 4,761,092 A | 8/1988 | Nakatani | |
| 4,932,622 A | 6/1990 | Hayakawa | |
| 5,072,910 A | 12/1991 | May | |
| 5,570,968 A | 11/1996 | Sassmannshausen et al. | |
| 5,813,647 A * | 9/1998 | Chen | B60P 7/15 410/151 |
| 5,863,015 A * | 1/1999 | Hsu | F16M 11/242 248/157 |
| 5,887,835 A | 3/1999 | Hein et al. | |
| 6,050,531 A | 4/2000 | Wilcox | |
| 6,702,482 B2 | 3/2004 | Sherwin | |
| 6,913,231 B2 * | 7/2005 | Speggiorin | F16M 11/32 403/109.5 |
| 7,086,631 B2 | 8/2006 | Lee et al. | |
| 8,336,835 B1 | 12/2012 | Benner et al. | |
| 8,376,646 B2 | 2/2013 | Melino, Sr. et al. | |
| 9,939,225 B2 | 4/2018 | Ravnaas | |
| 10,352,644 B2 | 7/2019 | Ravnaas | |
| 2006/0062632 A1 | 3/2006 | Jang | |
| 2012/0324682 A1 | 12/2012 | Ballentine | |

FOREIGN PATENT DOCUMENTS

| | | |
|---|---|---|
| EP | 2674629 A2 | 12/2013 |
| EP | 2687733 A1 | 1/2014 |
| WO | 1993012346 A1 | 6/1993 |

\* cited by examiner

*Primary Examiner* — Anita M King
(74) *Attorney, Agent, or Firm* — Taft Stettinius & Hollister LLP (57) ABSTRACT

A locking device to engage with an upper end of a lower elongate member and a lower end of an upper elongate member wherein the upper and lower elongate members are telescopically engaged. The locking device is operable in a disengaged position to frictionally hold the position of the lower elongate member relative to the upper elongate member. In the disengaged position, the locking device prevents retraction of the lower elongate member relative to the upper elongate member but enables extension of the lower elongate member relative to the upper elongate member. If a compressive force is applied to retract the lower elongate member within the upper elongate member, then the locking device grips the lower elongate member with more force to prevent retraction of the lower elongate member within the upper elongate member when the locking device is in the disengaged position.

18 Claims, 6 Drawing Sheets

LOCKING DEVICE FOR A TELESCOPING LEG

TECHNICAL FIELD

The present application relates generally to a telescoping leg, and more particularly to a lockable device that is mounted on the telescoping leg to enable and/or restrict adjustment of the length of the telescoping leg.

BACKGROUND

A conventional adjustable leg includes a lower leg section, or lower pole, telescopically mounted within an upper leg section, or upper pole. Typically, the upper pole has an upper pole diameter and the lower pole has a lower pole diameter wherein the lower pole diameter is less than the upper pole diameter to facilitate the telescopic engagement of the poles. The upper and lower poles may expand or retract relative to each other, and be locked in place by an adjusting system such as a pin-lock or threaded-lock system. These systems require two hands to operate the adjusting system to lengthen or shorten the combined length of the telescoping upper and lower poles. These adjusting systems are often difficult to operate.

Therefore, further contributions in this area of technology are needed to improve the ease of operation of the telescoping leg. Therefore, there remains a significant need for the apparatuses, methods and systems disclosed herein.

SUMMARY

One embodiment is a unique system, method, and apparatus that includes a locking device operable between engaged and disengaged positions wherein the locking device is mounted on upper and lower elongate members that are telescopically engaged. The locking device is configured for operation with one hand but can be operated by two hands if desired. The locking device is operable in a disengaged position to frictionally hold the position of the lower elongate member relative to the upper elongate member. In the disengaged position, the locking device enables extension of the lower elongate member relative to the upper elongate member. If a compressive force is applied to push the upper elongate member down onto the lower elongate member, then the locking device grips the lower elongate member with more force or resistance to prevent retraction of the lower elongate member within the upper elongate member when the locking device is in the disengaged position. In an engaged position, the locking device enables retraction or extension of the lower elongate member relative to the upper elongate member.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
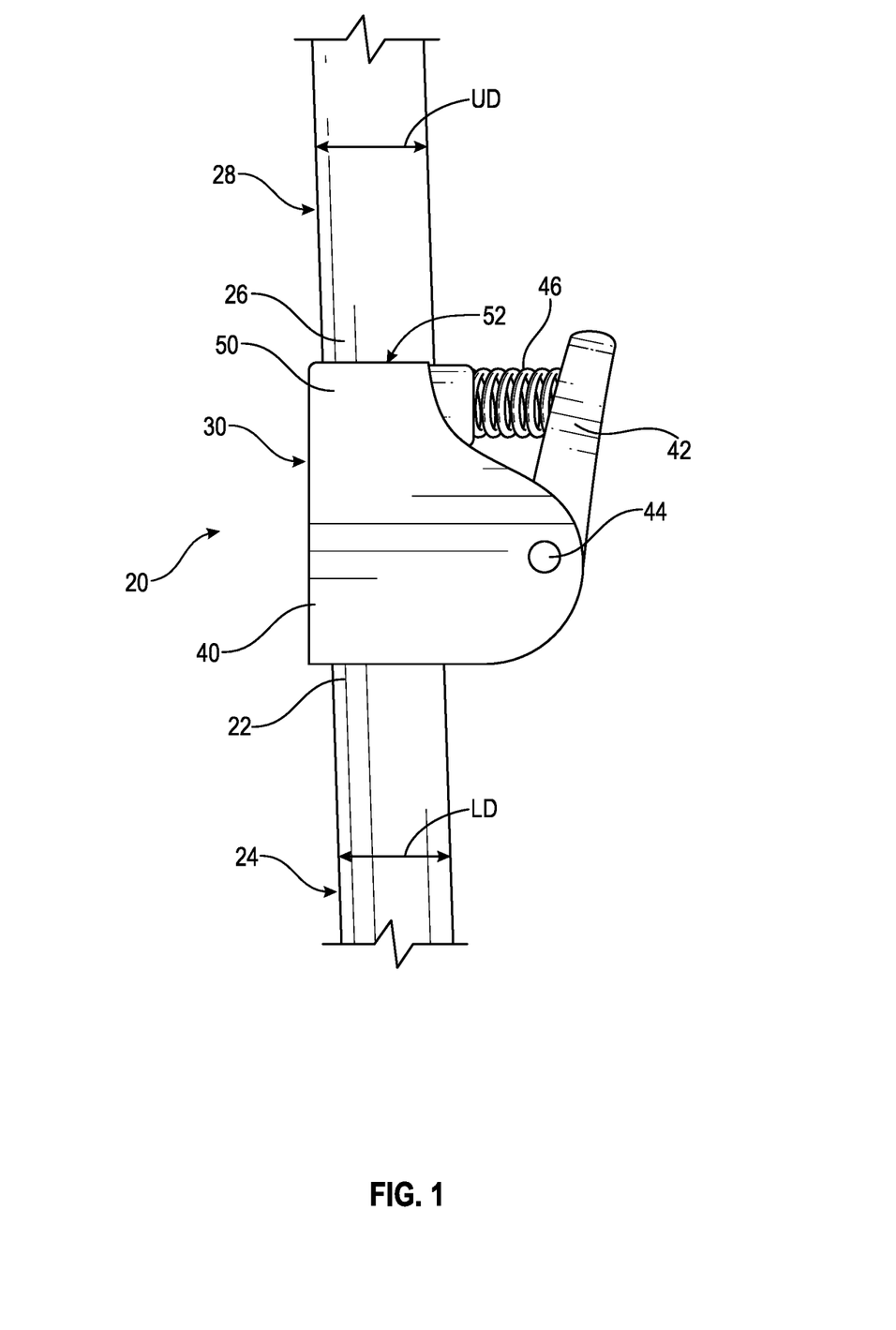
FIG. 1 is a side view of a locking device assembled with a lower elongate member and an upper elongate member of the present disclosure shown in a disengaged position.

Turning now to FIG. 1, a locking device 20 is illustrated wherein the locking device 20 is mounted or attached to an upper end 22 of a lower elongate member 24 and a lower end 26 of an upper elongate member 28 for a telescoping leg such as a leg for a monopod, bipod or tripod for supporting a rifle or camera. The upper end 22 of the lower elongate member 24 and the lower end 26 of the upper elongate member 28 meet at a joint 30 wherein the locking device 20 is attached at the joint 30. The locking device 20 of the present application is not limited to use for legs for bipods. The locking device 20 can be used in various applications where it would be useful to adjust a length of a telescopic rod, tube, or leg. Multiple locking devices 20 can be used for example on a tripod leg or a multi-stage telescoping leg having multiple joints wherein at least one of the joints includes one of the locking devices 20, or wherein each of the joints includes one of the locking devices 20. The locking device 20 is used to adjust the lower elongate member 24 relative to the upper elongate member 28, and to hold the lower elongate member 24 in place relative to the upper elongate member 28 once the lower elongate member 24 is adjusted. The locking device 20 works equally well when the upper elongate member 28 is positioned below the lower elongate member 24 or the telescoping leg is upside down.

While elongate members 24 and 28 can have a wide variety of configurations, such members commonly are in the form of cylindrical tubes and, for convenience, are depicted in the drawings as cylindrical tubes. The lower and upper elongate members 24 and 28 each include a longitudinal axis that spans along the lengths thereof. The longitudinal axes of the lower and upper elongate members 24 and 28 align with each other when the lower and upper elongate members 24 and 28 are assembled together. The lower and upper elongate members 24 and 28 are made of a pressure-resistant material. Some example materials for the lower and upper elongate members 24 and 28 include plastic, polyester, polyimide, metal, and/or fiber-reinforced material to name a few.

In the illustrated embodiment, the lower elongate member 24 is in the form of a lower tube and has a lower tube outer diameter, LD, and the upper elongate member 28 is in the form of an upper tube and has an upper tube inner diameter, UD, wherein the lower tube outer diameter, LD, is smaller than the upper tube inner diameter, UD. The upper elongate member 28 is telescopically engaged with the lower elongate member 24 wherein the lower elongate member 24 retracts or is pushed within a bore or cavity of the upper elongate member 28 when the locking device 20 is in an engaged position to shorten a total length of the leg. In an engaged position, the locking device 20 enables retraction or extension of the lower elongate member 24 relative to the upper elongate member 28. In the engaged position, the locking device 20 does not frictionally engage the lower elongate member 24 but instead the locking device 20 is engaged by a user.

To prevent premature or undesired shortening of the leg by retraction of the lower elongate member 24 relative to the upper elongate member 28, the locking device 20 is operated in the disengaged position such that the user does not engage the locking device 20. The locking device 20 is operable in a disengaged position to frictionally hold the position of the lower elongate member 24 relative to the upper elongate member 28. In the disengaged position, the locking device 20 enables extension of the lower elongate member 24 relative to the upper elongate member 28. If a longitudinal compressive force is applied to push the upper elongate member 28 down onto or towards the lower elongate member 24, then the locking device 20 grips the lower elongate member 24 with more force or resistance to prevent retraction of the lower elongate member 24 within the upper elongate member 28 when the locking device 20 is in the disengaged position.

The lower elongate member 24 can extend relative to the upper elongate member 28 when the locking device 20 is in either of the engaged or disengaged positions.

Operation of the locking device 20 is explained in more detail below. The locking device 20 is configured to operate when the lower elongate member 24 is oriented below the upper elongate member 28 and the locking device 20 is configured to operate when the upper elongate member 28 is oriented below the lower elongate member 24. The locking device 20 includes a clamp housing 40, a lever 42, a pin 44, and a biasing member 46. In the illustrated embodiment, the locking device 20 also includes a friction member 48. In other embodiments the locking device 20 does not include the friction member 48 but the lever 42 is configured differently as described below.

Figure 5:
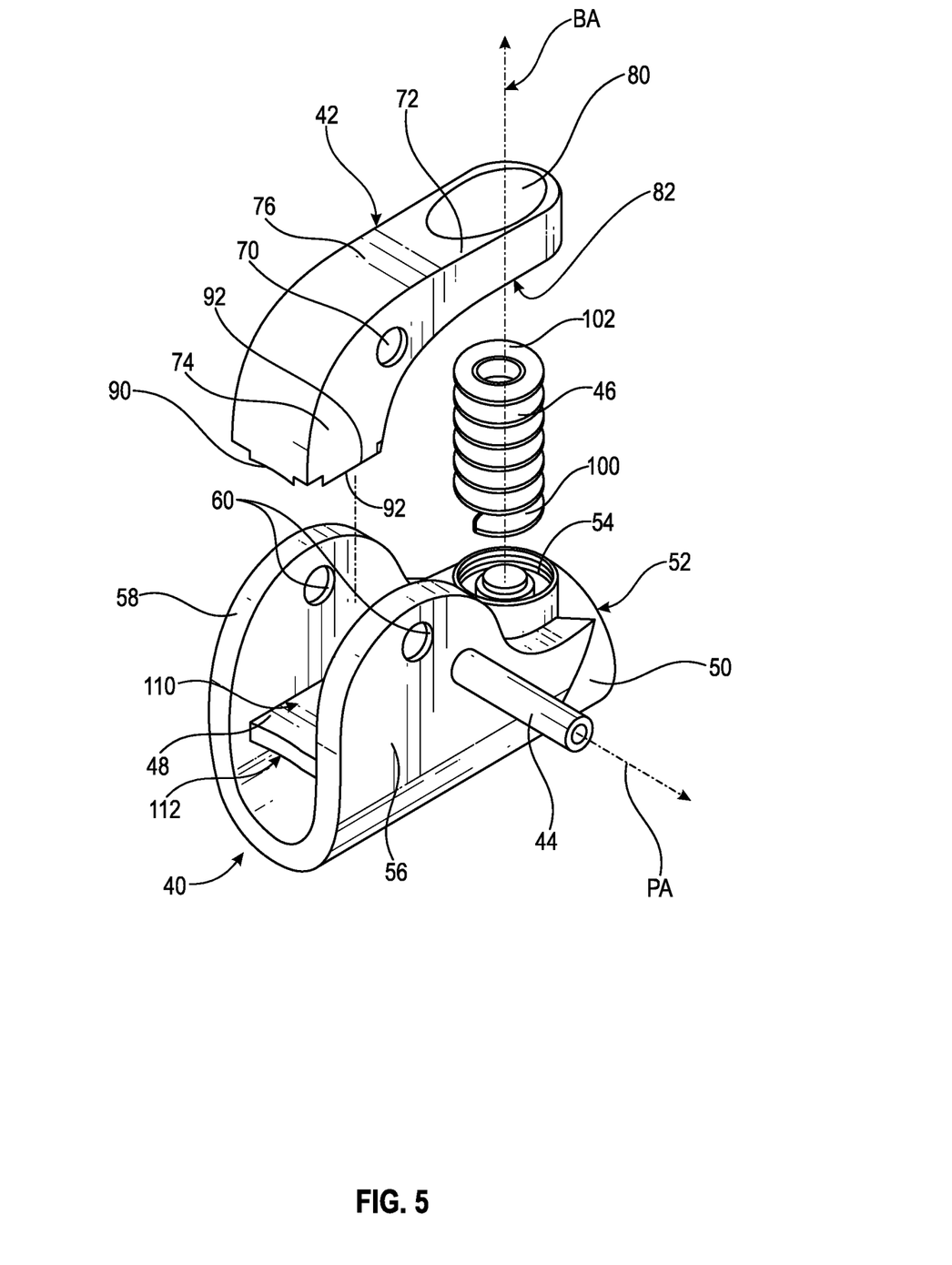
FIG. 5 is an exploded perspective view of the locking device of the FIG. 1 embodiment of the present disclosure.
Figure 6:
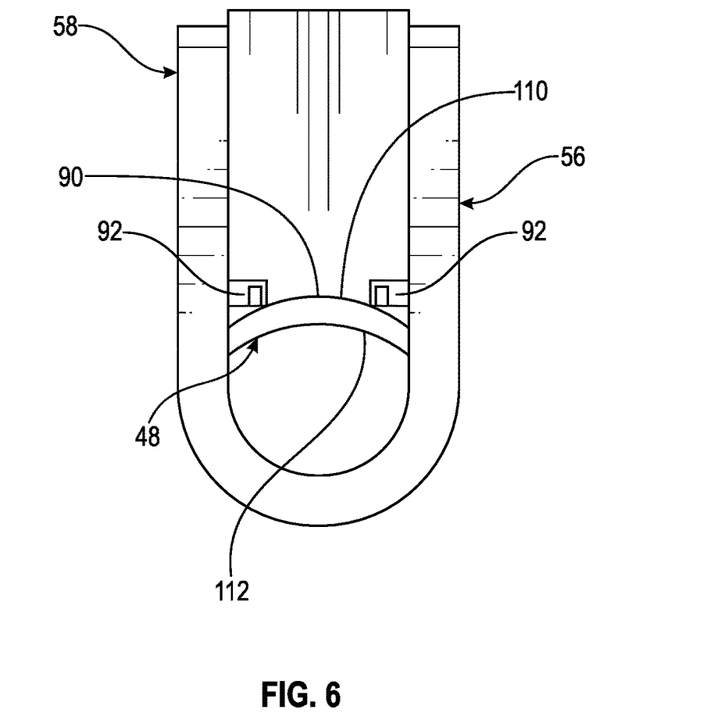
FIG. 6 is a top view of the FIG. 5 embodiment of the present disclosure.
Figure 7:
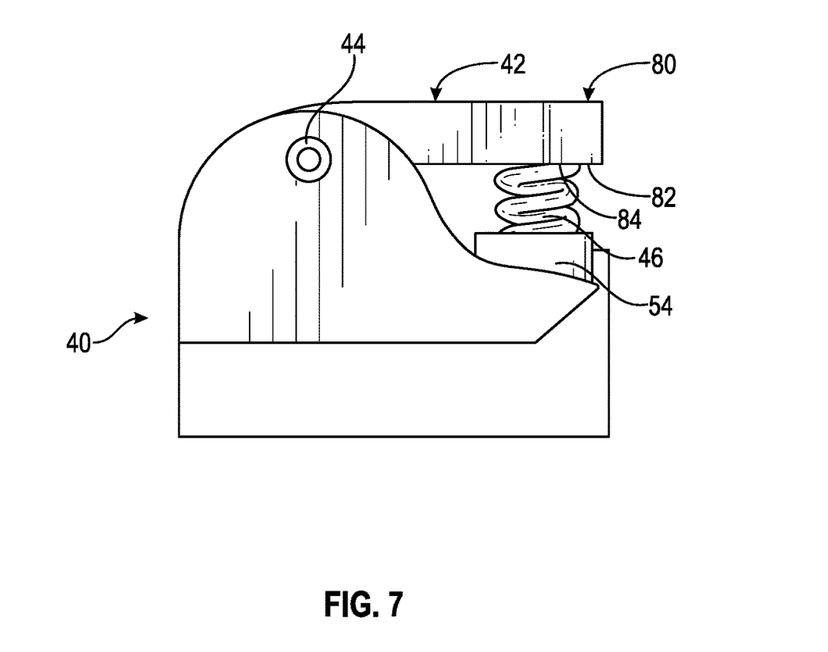
FIG. 7 is a side view of the FIG. 5 embodiment of the present disclosure.

The clamp housing 40 includes a base 50 that defines a bore 52 that is sized to receive and retain the lower end 26 of the upper elongate member 28 therein. The base 50 also includes a biasing receptacle 54 that is configured to retain a first end 100 of the biasing member 46. The clamp housing 40 includes a pair of clamp walls 56 and 58 that extend away from the base 50 wherein each of the pair of clamp walls 56 and 58 includes a pin hole 60. The pin holes 60 are sized to receive and retain the pin 44 therein such that the pin 44 and pin holes 60 define a pin axis, PA. The pin holes 60 are sized and positioned on the pair of clamp walls 56 and 58 to align with a through-hole 70 on the lever 42 such that the assembly of the pin 44 through the pin holes 60 and the through-hole 70 of the lever 42 thereby assembles or operably connects the lever 42 to the clamp housing 40 such that the lever 42 pivots or rotates about the pin axis PA. The pin 44 rotatably supports the lever 42 on the pin holes 60 of the clamp housing 40 to operably connect the lever 42 to the clamp housing 40. The pin axis PA of the pin 44 and the pin holes 60 are located between the friction member 48 and the biasing member 46 when these elements and the lever 42 are assembled with the clamp housing 40. The pin axis PA of the pin holes 60 is spaced a longitudinal distance from a biasing axis BA of the biasing member 46. In one form, the pin 44 is a clamp spring pin however other types of pins, shafts, or connectors can be used for the pin 44.

Figure 2:
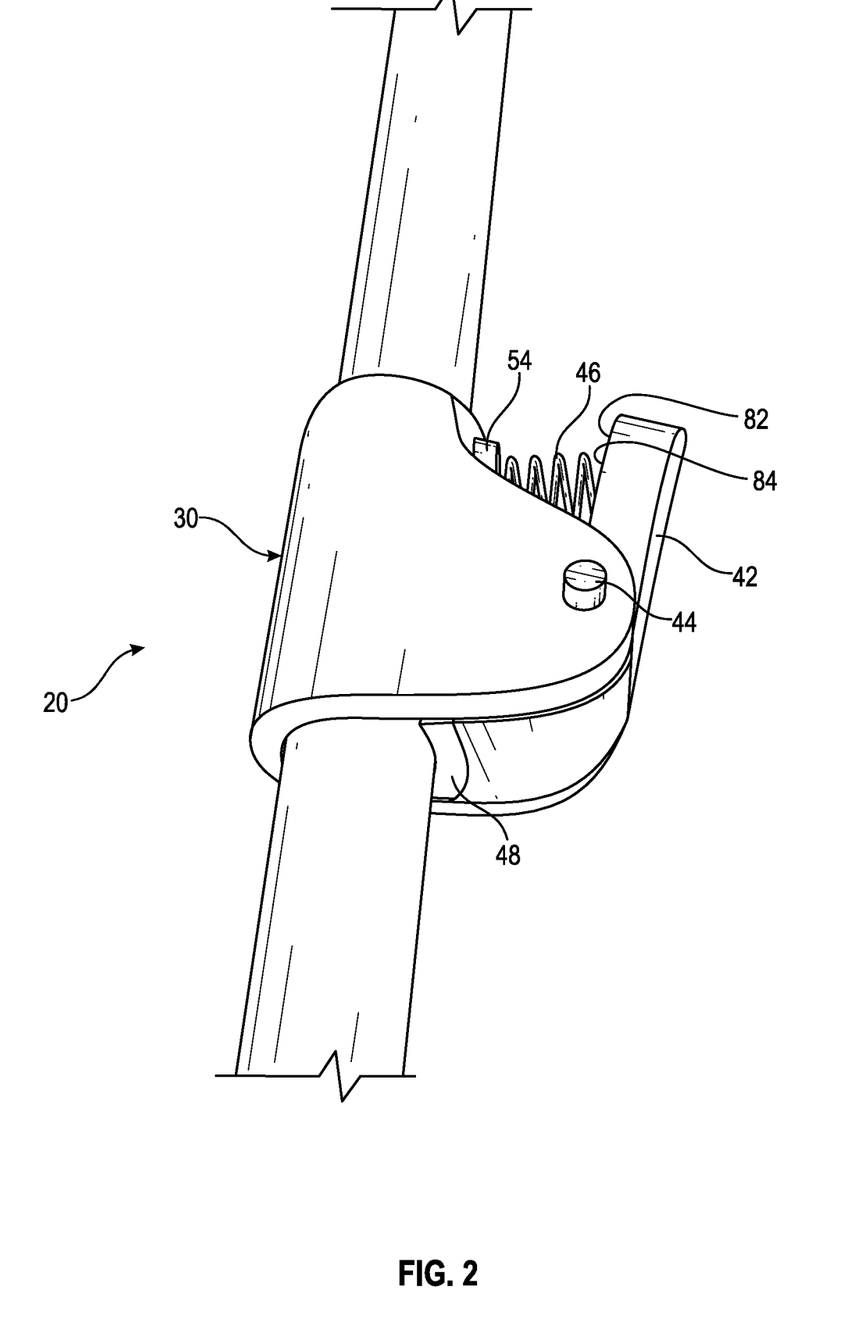
FIG. 2 is a bottom perspective view of the FIG. 1 embodiment of the present disclosure shown in a disengaged position.
Figure 3:
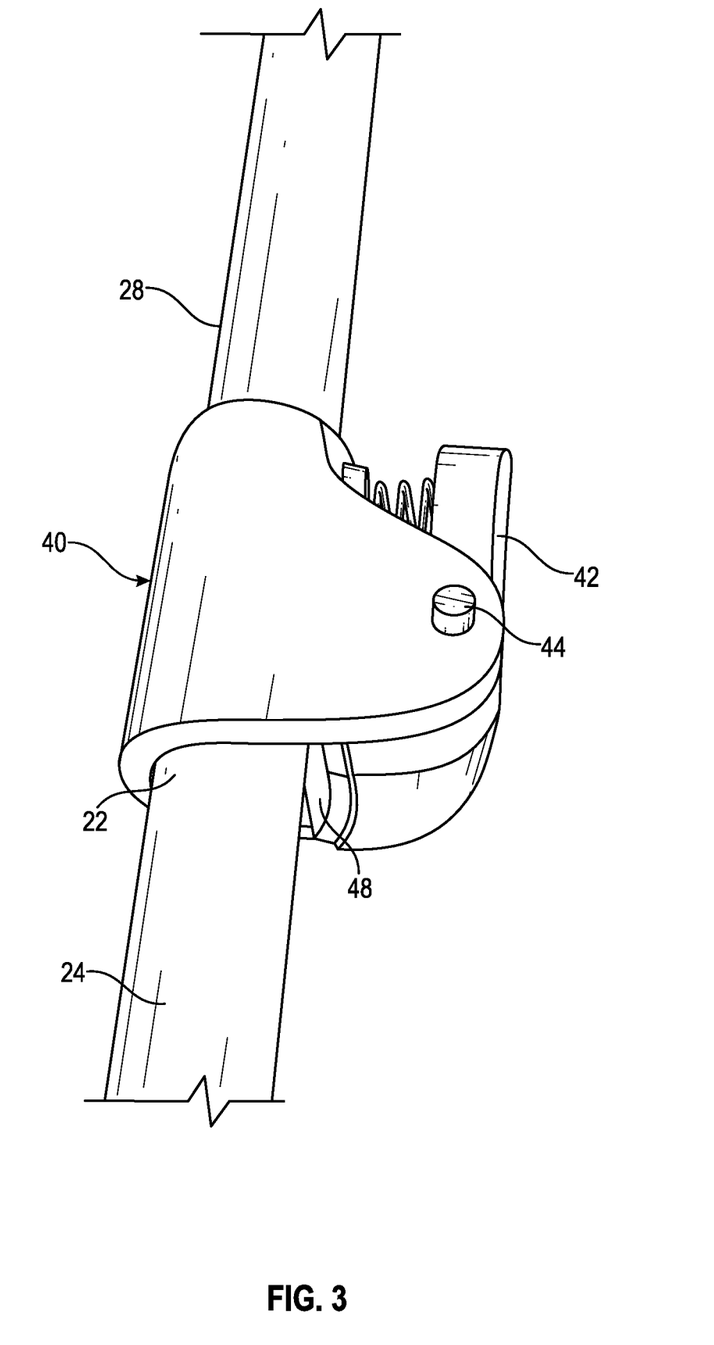
FIG. 3 is a bottom perspective view of the FIG. 1 embodiment of the present disclosure shown in a partially engaged position.
Figure 4:
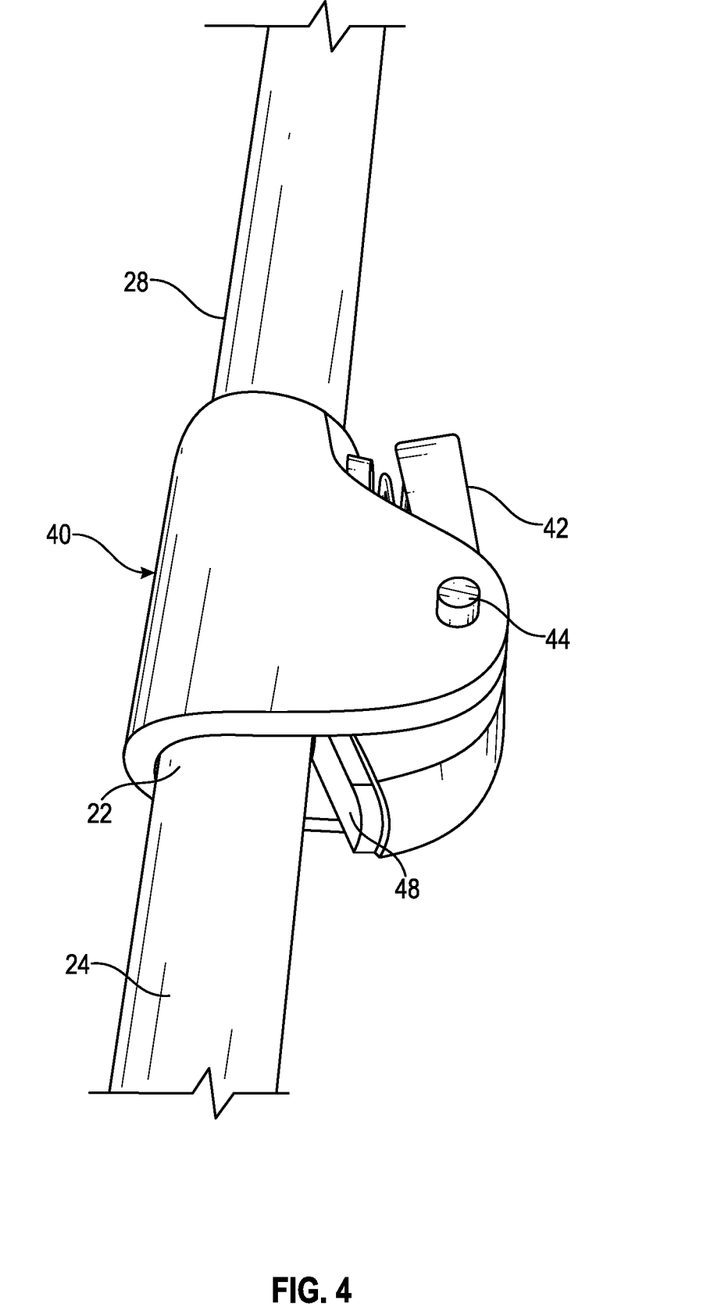
FIG. 4 is a bottom perspective view of the FIG. 1 embodiment of the present disclosure shown in a fully engaged position.

The lever 42 includes a grip portion 72 opposite a head portion 74 and a handle 76 that spans between the grip portion 72 and the head portion 74. The handle 76 has a length sufficient to offset the head portion 74 from the grip portion 72. The handle 76 includes the through-hole 70 sized to receive the pin 44 therein. As such, the through-hole 70 is not positioned in the head portion 74 or the grip portion 72. The lever 42 rotates about the pin axis PA between an engaged position as illustrated in FIGS. 3 and 4, and a disengaged position illustrated in FIGS. 1 and 2.

The grip portion 72 includes a top 80 opposite a bottom 82. Optionally, the top 80 can be configured to receive a finger for engagement and operation of the lever 42. The grip portion 72 also includes a seat 84 positioned on the bottom 82. The seat 84 is configured to retain a second end 102 of the biasing member 46 such that the biasing member 46 is captured between the grip portion 72 of the lever 42 and the biasing receptacle 54 of the clamp housing 40.

The head portion 74 includes a head face 90 that is oriented to face the clamp housing 40. The head face 90 includes a plurality of prongs 92 that are shaped to fixedly retain the friction member 48 thereon. In the illustrated embodiment, the head face 90 is a concave surface and the friction member 48 is also curved similarly to the head face 90. The curvature of the friction member 48 and the head face 90 is similar to the curvature of the upper end 22 of the lower elongate member 24. The head face 90 is further sized similarly to the friction member 48. In other embodiments, the head face 90 has a curved smooth surface without the plurality of prongs 92 such that the head face 90 is sized and configured to rest directly against the upper end 22 of the lower elongate member 24 without the friction member 48 attached thereto.

The biasing member 46 includes the first end 100 opposite the second end 102 and a length that spans between the first and second ends 100 and 102. The biasing member 46 is operably attached to the biasing receptacle 54 of the clamp housing 40 and the seat 84 of the grip portion 72 of the lever 42. The biasing member 46 includes a biasing axis BA that is aligned between the biasing receptacle 54 of the clamp housing 40 and the seat 84 of the grip portion 72, wherein the biasing axis BA is longitudinally offset from the pin axis PA. In one form, the biasing member 46 is a compression spring that exerts a force on the grip portion 72 when the lever 42 is in the disengaged position such that the biasing member 46 urges the grip portion 72 of the lever 42 away from the upper elongate member 28 to thereby rotate the head portion 74 of the lever 42 about the pin axis PA towards and against the upper end 22 of the lower elongate member 24 to prevent retraction of the lower elongate member 24 relative to the upper elongate member 28 as illustrated in FIGS. 1 and 2. As such, the head face 90 and the friction member 48 engage with the upper end 22 of the lower elongate member 24 to apply a compressive force against the upper end 22 of the lower elongate member 24 to restrict the lower elongate member 24 from retracting relative to or telescoping within the upper elongate member 28. Alternatively, the biasing member 46 maintains the lever 42 in the disengaged position such that the head portion 74 and the friction member 48 maintain contact with the upper end 22 of the lower elongate member 24 to restrict the lower elongate member 24 from retracting relative to the upper elongate member 28. As such, the stiffness or spring constant of the biasing member 46 affects the amount of compressive force applied by the head portion 74 and the friction member 48 to the upper end 22 of the lower elongate member 24.

The friction member 48 includes a top surface 110 opposite a bottom surface 112. The top surface 110 is configured for attachment to the head face 90 of head portion 74 of the lever 42. The bottom surface 112 is configured to engage the upper end 22 of the lower elongate member 24 when the lever 42 is in the disengaged position. In the illustrated embodiment, the bottom surface 112 is concave with a similar radius as the upper end 22 of the lower elongate member 24 so that the bottom surface 112 rests against the upper end 22 of the lower elongate member 24 when the lever 42 is in the disengaged position. In the illustrated embodiment, the top and bottom surfaces 110 and 112 have a width that spans between the pair of clamp walls 56 and 58, however in other embodiments the top and bottom surfaces 110 and 112 may not span fully between the clamp walls 56 and 58. The top and bottom surfaces 110 and 112 have a length that is sufficient for the friction member 48 to engage the upper end 22 of the lower elongate member 24. As discussed above, a force applied by the friction member 48 against the upper end 22 of the lower elongate member 24 increases when a compressive force is applied to the upper elongate member 28 and/or the lower elongate member 24. The friction member 48 is made of a compressible material. In one form, the friction member 48 is made of elastomer and/or rubber.

When the lever 42 is in a disengaged position, and a downward or compressive force is exerted onto either of the lower or upper elongate members 24 and 28 such as when a user attempts to push the lower and upper elongate members 24 and 28 together and retract the lower elongate member 24 relative to the upper elongate member 28, the lever 42 will slightly rotate about the pin axis PA of the pin holes 60 as the friction member 48 further engages the upper end 22 of the lower elongate member 24. The rotation of the head portion 74 towards the lower elongate member 24 causes the friction member 48 to more tightly grip the upper end 22 of the lower elongate member 24 which is an advantage over other prior art tripod designs. In other words, when the clamp housing 40 is in the use or disengaged position, the harder a user pushes on the lower elongate member 24 (or the upper elongate member 28) to attempt to retract the lower elongate member 24 within the upper elongate member 28, the more tightly the friction member 48 and the head face 90 will grip the upper end 22 of the lower elongate member 24. This effect is due to a combination of the design of the lever 42 being rotatable about the pin axis PA and the increase in compressive force and friction from the friction member 48 and/or the head portion 74 against the upper end 22 of the lower elongate member 24.

In an engaged or adjustment position illustrated in FIGS. 3 and 4, a user engages or presses against the grip portion 72 of the lever 42 to compress the biasing member 46 towards the lower elongate member 24. As the biasing member 46 is compressed, the lever 42 rotates about the pin axis PA such that the friction member 48 and the head portion 74 of the lever 42 rotate away from the upper end 22 of the lower elongate member 24 to enable extension or retraction of the lower elongate member 24 relative to the upper elongate member 28. In the adjustment position, the grip portion 72 of the lever 42 is depressed so that the friction member 48 and the head portion 74 on the lever 42 are lifted away from the lower elongate member 24, and therefore the lower elongate member 24 can be moved so that either a greater or lesser length of the lower elongate member 24 is within the upper elongate member 28. Another advantage of the locking device 20 is that tools are not required in order to adjust the length of the of the lower elongate member 24 within the upper elongate member 28.

As is evident from the figures and text presented above, a variety of aspects of the present disclosure are contemplated.

Various aspects of the present application are contemplated. According to one aspect, an apparatus comprising: a lower elongate member comprising an upper end; an upper elongate member telescopically engaged with the lower elongate member; a locking device configured to engage with the upper end of the lower elongate member and the lower end of the upper elongate member, the locking device includes: a clamp housing that defines a bore sized to receive and retain the lower end of the upper elongate member, the clamp housing defines a pair of pin holes sized to receive a pin therein; a lever having a grip portion opposite a head portion and a handle that spans between the grip portion and the head portion, wherein the handle defines a through-hole sized to receive the pin therein, wherein the lever is rotatable about the pin holes between an engaged position and a disengaged position; wherein the pin operably connects the lever to the clamp housing to rotatably support the lever on the clamp housing, the pin having a pin axis about which the lever rotates; and a biasing member operably engaged between the clamp housing and the grip portion of the lever, the biasing member urges the grip portion of the lever away from the upper elongate member to thereby rotate the head portion of the lever to the upper end of the lower elongate member when the lever is in the disengaged position to prevent retraction of the lower elongate member relative to the upper elongate member.

In one embodiment, wherein the locking device further comprises: a friction member attached to the head portion of the lever, wherein the friction member presses against the upper end of the lower elongate member when the lever is in the disengaged position. In one embodiment, wherein the friction member has a concave surface that engages the upper end of the lower elongate member when the lever is in the disengaged position. In one embodiment, wherein a force applied by the friction member against the upper end of the lower elongate member increases when a compressive force is applied to the upper elongate member and/or the lower elongate member. In one embodiment, wherein the lever rotates about the pin axis to increase the force applied by the friction member against the upper end of the lower elongate member. In one embodiment, wherein the head portion of the lever is longitudinally offset from the pair of pin holes. In one embodiment, wherein the head portion of the lever includes a plurality of prongs to fixedly retain the friction member thereon. In one embodiment, wherein the friction member and the head portion of the lever rotate away from the upper end of the lower elongate member when the lever is in an engaged position to enable extension or retraction of the lower elongate member relative to the upper elongate member.

In one embodiment, wherein the clamp housing includes a base that defines the bore, and the clamp housing includes a pair of clamp walls that extend away from the base wherein each of the pair of clamp walls includes one of the pair of pin holes sized to receive the pin.

According to another aspect, an apparatus comprising: a lower elongate member comprising an upper end; an upper elongate member telescopically engaged with the lower elongate member; a locking device configured to engage with the upper end of the lower elongate member and the lower end of the upper elongate member, the locking device includes: a clamp housing that defines a bore sized to receive and retain the lower end of the upper elongate member, the clamp housing defines a pair of pin holes sized to receive a pin therein to define a pin axis; a lever having a grip portion opposite a head portion and a handle that spans between the grip portion and the head portion, wherein the handle defines a through-hole sized to receive the pin therein to assemble the lever with the clamp housing such that the lever is rotatable about the pin axis of the pin between an engaged position and a disengaged position, the head portion being longitudinally offset from the pin axis; and a biasing member operably engaged between the clamp housing and the lever, the biasing member urges the grip portion of the lever away from the upper elongate member to thereby rotate the head portion of the lever to contact the upper end of the lower elongate member when the lever is in the disengaged position to prevent retraction of the lower elongate member relative to the upper elongate member.

In one embodiment, wherein the upper elongate member and the lower elongate member include a longitudinal axis along the lengths thereof, the biasing member includes a biasing axis that is aligned between the clamp housing and the grip portion of the lever, the biasing axis being longitudinally offset from the pin axis of the pin.

In one embodiment, wherein the lower elongate member has a lower tube outer diameter and the upper elongate member has an upper tube inner diameter, the lower tube outer diameter being smaller than the upper tube inner diameter.

In one embodiment, wherein the locking device further comprises: a friction member attached to the head portion of the lever, wherein the friction member presses against the upper end of the lower elongate member when the lever is in the disengaged position to prevent retraction of the lower elongate member relative to the upper elongate member. In one embodiment, wherein the friction member has a curved surface to engage the upper end of the lower elongate member when the lever is in the disengaged position. In one embodiment, wherein a compressive force is applied to push the upper elongate member towards the lower elongate member to thereby further press the friction member against the upper end of the lower elongate member to engage the lever to rotate about the pin. In one embodiment, wherein the friction member is made of a compressible material. In one embodiment, wherein the head portion of the lever includes a plurality of prongs to fixedly retain the friction member thereon. In one embodiment, wherein the friction member and the head portion of the lever rotate away from the upper end of the lower elongate member when the lever is in an engaged position to enable extension or retraction of the lower elongate member relative to the upper elongate member.

In one embodiment, wherein the clamp housing includes a base that defines the bore, and the clamp housing includes a pair of clamp walls that extend away from the base wherein the pair of clamp walls includes the pair of pin holes sized to receive the pin. In one embodiment, wherein the friction member has a width that spans between the pair of clamp walls.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a lower elongate member comprising an upper end;
an upper elongate member defining an elongate cavity therein and telescopically engaged with the lower elongate member;
a locking device configured to engage with the upper end of the lower elongate member and a lower end of the upper elongate member, wherein the locking device includes:
a clamp housing that defines a bore sized to receive and retain the lower end of the upper elongate member, wherein the clamp housing defines a pair of pin holes sized to receive a pin therein;
a lever having a grip portion opposite a head portion and a handle that spans between the grip portion and the head portion, wherein the handle defines a through-hole sized to receive the pin therein, wherein the lever is rotatable about the pin holes between an engaged position and a disengaged position;
wherein the pin operably connects the lever to the clamp housing to rotatably support the lever on the clamp housing, the pin having a pin axis about which the lever rotates;
a biasing member operably engaged between the clamp housing and the grip portion of the lever, wherein the biasing member urges the grip portion of the lever away from the upper elongate member to thereby rotate the head portion of the lever into contact with the upper end of the lower elongate member when the lever is in the disengaged position to prevent retraction of the lower elongate member relative to the upper elongate member; and
a friction member attached to the head portion of the lever, wherein the friction member presses against the upper end of the lower elongate member when the lever is in the disengaged position, wherein the friction member and the head portion of the lever rotate away from the upper end of the lower elongate member when the lever is in an engaged position to enable extension or retraction of the lower elongate member relative to the upper elongate member.

2. The apparatus of claim 1, wherein the friction member has a concave surface that engages the upper end of the lower elongate member when the lever is in the disengaged position.

3. The apparatus of claim 1, wherein a force applied by the friction member against the upper end of the lower elongate member increases when a longitudinal compressive force is applied to the upper elongate member and/or the lower elongate member.

4. The apparatus of claim 3, wherein the lever rotates about the pin axis to increase the force applied by the friction member against the upper end of the lower elongate member upon application of the longitudinal compressive force.

5. The apparatus of claim 1, wherein the head portion of the lever is longitudinally offset from the pair of pin holes.

6. The apparatus of claim 1, wherein the head portion of the lever includes a plurality of prongs to fixedly retain the friction member thereon.

7. The apparatus of claim 1, wherein the clamp housing includes a base that defines the bore, and the clamp housing includes a pair of clamp walls that extend away from the base wherein each of the pair of clamp walls includes one of the pair of pin holes sized to receive the pin.

8. An apparatus comprising:
a lower elongate member comprising an upper end;
an upper elongate member defining an elongate cavity and telescopically engaged with the lower elongate member;
a locking device configured to engage with the upper end of the lower elongate member and a lower end of the upper elongate member, wherein the locking device includes:
a clamp housing that defines a bore sized to receive and retain the lower end of the upper elongate member, wherein the clamp housing defines a pair of pin holes sized to receive a pin therein to define a pin axis;
a lever having a grip portion opposite a head portion and a handle that spans between the grip portion and the head portion, wherein the handle defines a through-hole sized to receive the pin therein to assemble the lever with the clamp housing such that the lever is rotatable about the pin axis of the pin between an engaged position and a disengaged position, the head portion being longitudinally offset from the pin axis;
a biasing member operably engaged between the clamp housing and the lever, wherein the biasing member urges the grip portion of the lever away from the upper elongate member to thereby rotate the head portion of the lever to contact the upper end of the lower elongate member when the lever is in the disengaged position to prevent retraction of the lower elongate member relative to the upper elongate member; and
a friction member attached to the head portion of the lever, wherein the friction member presses against the upper end of the lower elongate member when the lever is in the disengaged position to prevent retraction of the lower elongate member relative to the upper elongate member, wherein the friction member and the head portion of the lever rotate away from the upper end of the lower elongate member when the lever is in an engaged position to enable extension or retraction of the lower elongate member relative to the upper elongate member.

9. The apparatus of claim 8, wherein the upper elongate member and the lower elongate member include a longitudinal axis along the lengths thereof, wherein the biasing member includes a biasing axis that is aligned between the clamp housing and the grip portion of the lever, the biasing axis being longitudinally offset from the pin axis of the pin.

10. The apparatus of claim 8, wherein the lower elongate member comprises a lower tube having a lower tube outer diameter and the upper elongate member comprises an upper tube having an upper tube inner diameter, the lower tube outer diameter being smaller than the upper tube inner diameter.

11. The apparatus of claim 8, wherein the friction member has a curved surface to engage the upper end of the lower elongate member when the lever is in the disengaged position.

12. The apparatus of claim 8, wherein a compressive force applied to push the upper elongate member towards the lower elongate member causes the friction member to press against the upper end of the lower elongate member to engage the lever to rotate about the pin.

13. The apparatus of claim 8, wherein the friction member is made of a compressible material.

14. The apparatus of claim 8, wherein the head portion of the lever includes a plurality of prongs to fixedly retain the friction member thereon.

15. The apparatus of claim 8, wherein the friction member and the head portion of the lever rotate away from the upper end of the lower elongate member when the lever is in an engaged position to enable extension or retraction of the lower elongate member relative to the upper elongate member.

16. The apparatus of claim 8, wherein the clamp housing includes a base that defines the bore, wherein the clamp housing includes a pair of clamp walls that extend away from the base, and wherein the pair of clamp walls includes the pair of pin holes sized to receive the pin.

17. The apparatus of claim 16, wherein the friction member has a width that spans between the pair of clamp walls.

18. An apparatus comprising:
   a lower elongate member comprising an upper end;
   an upper elongate member defining an elongate cavity therein and telescopically engaged with the lower elongate member;
   a locking device configured to engage with the upper end of the lower elongate member and a lower end of the upper elongate member, wherein the locking device includes:
      a clamp housing that defines a bore sized to receive and retain the lower end of the upper elongate member, wherein the clamp housing defines a pair of pin holes sized to receive a pin therein;
      a lever having a grip portion opposite a head portion and a handle that spans between the grip portion and the head portion, wherein the handle defines a through-hole sized to receive the pin therein, wherein the lever is rotatable about the pin holes between an engaged position and a disengaged position;
   wherein the pin operably connects the lever to the clamp housing to rotatably support the lever on the clamp housing, the pin having a pin axis about which the lever rotates;
   a biasing member operably engaged between the clamp housing and the grip portion of the lever, wherein the biasing member urges the grip portion of the lever away from the upper elongate member to thereby rotate the head portion of the lever into contact with the upper end of the lower elongate member when the lever is in the disengaged position to prevent retraction of the lower elongate member relative to the upper elongate member; and
   a friction member attached to the head portion of the lever, wherein the head portion of the lever includes a plurality of prongs to fixedly retain the friction member thereon, wherein the friction member presses against the upper end of the lower elongate member when the lever is in the disengaged position.

\* \* \* \* \*